United States Patent [19]

Peachee

[11] 4,306,168
[45] Dec. 15, 1981

[54] SYSTEM AND METHOD OF SECURING END SHIELDS TO THE STATOR ASSEMBLY OF A DYNAMOLELECTRIC MACHINE

[75] Inventor: C. Theodore Peachee, Maryland Heights, Mo.

[73] Assignee: Emerson Electric Co., St. Louis, Mo.

[21] Appl. No.: 956,355

[22] Filed: Oct. 31, 1978

[51] Int. Cl.³ .................................................. H02K 1/06
[52] U.S. Cl. .................................. 310/217; 310/42; 310/91; 310/254
[58] Field of Search ................ 310/85, 89, 90, 91, 310/42, 259, 40 MM, 216, 217, 254; 336/210

[56] References Cited

U.S. PATENT DOCUMENTS

| | | | |
|---|---|---|---|
| 738,782 | 9/1903 | Edwards | 310/89 |
| 1,771,475 | 7/1930 | Wright | 310/42 |
| 2,120,427 | 6/1938 | Kronmiller | 310/90 |
| 2,870,356 | 1/1959 | Gibson | 310/90 |
| 2,871,384 | 1/1959 | Gabriel | 310/90 |
| 3,445,698 | 5/1969 | Miko | 310/89 |
| 3,590,292 | 6/1971 | Poliakoff | 310/90 |

FOREIGN PATENT DOCUMENTS

| | | | |
|---|---|---|---|
| 2430093 | 8/1976 | Fed. Rep. of Germany | 310/90 |
| 437499 | 11/1967 | Switzerland | 310/90 |

Primary Examiner—R. Skudy
Attorney, Agent, or Firm—Polster, Polster and Lucchesi

[57] ABSTRACT

A system and method of securing the end shields of a dynamoelectric machine (e.g., a fractional horsepower electric motor) to its stator assembly with the rotor assembly of the motor held centered within the bore of the stator assembly and journalled in the motor's end shields. The system involves the use of threaded fasteners (preferably self-tapping screws or the like) which are inserted through enlarged holes provided in the end shield into mating holes provided in the end face of the core of the stator assembly. With the rotor accurately centered in the stator above, the fasteners are tightened thereby to firmly and securely draw the end shield into firm gripping engagement with the end face of the stator core while the desired uniform air gap between the rotor and the bore of the stator assembly is maintained.

2 Claims, 8 Drawing Figures

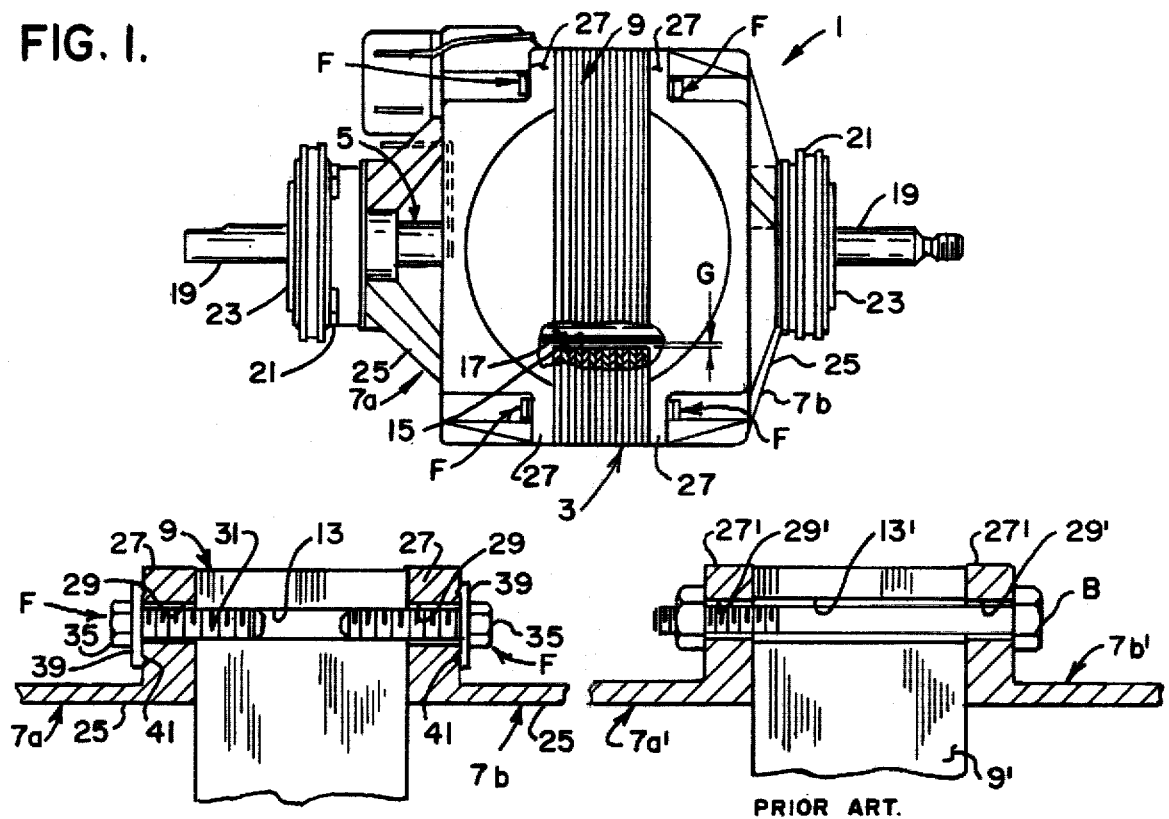
FIG. 1.
FIG. 2.
FIG. 3.
PRIOR ART.
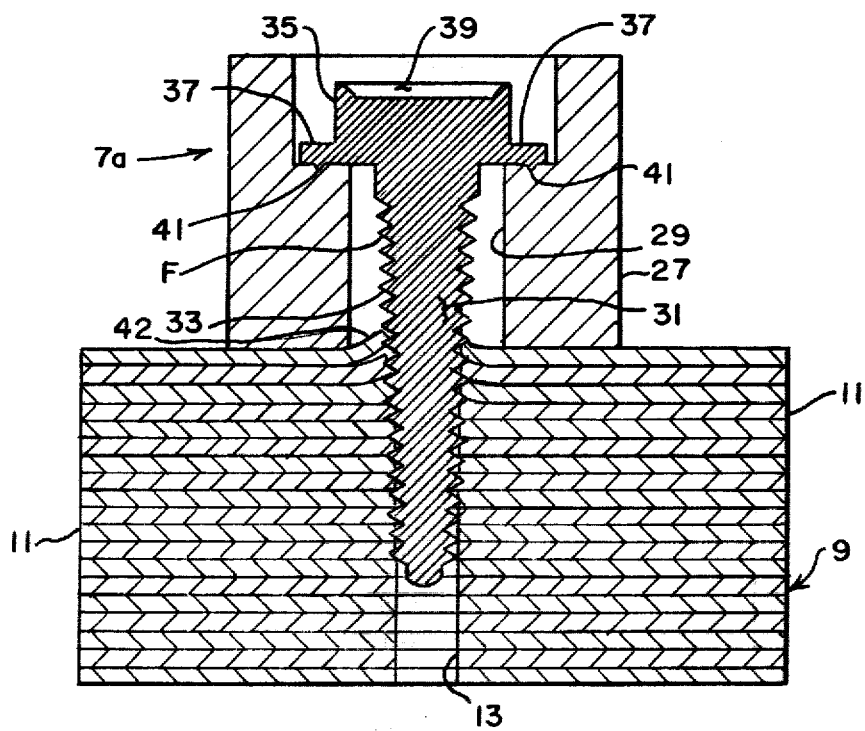
FIG. 4.

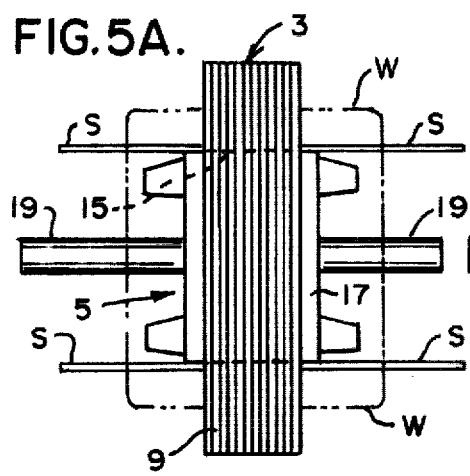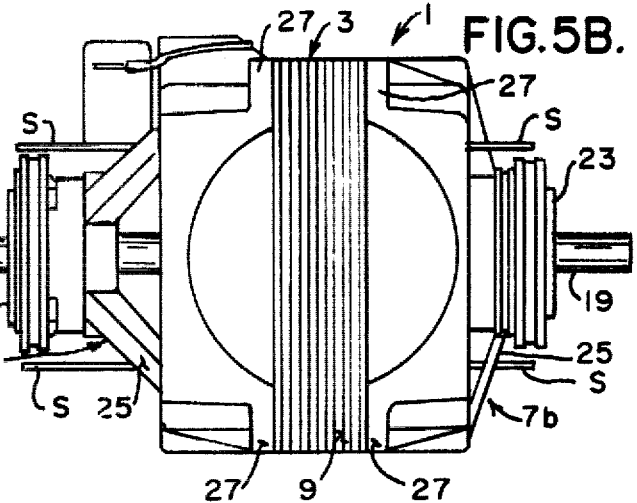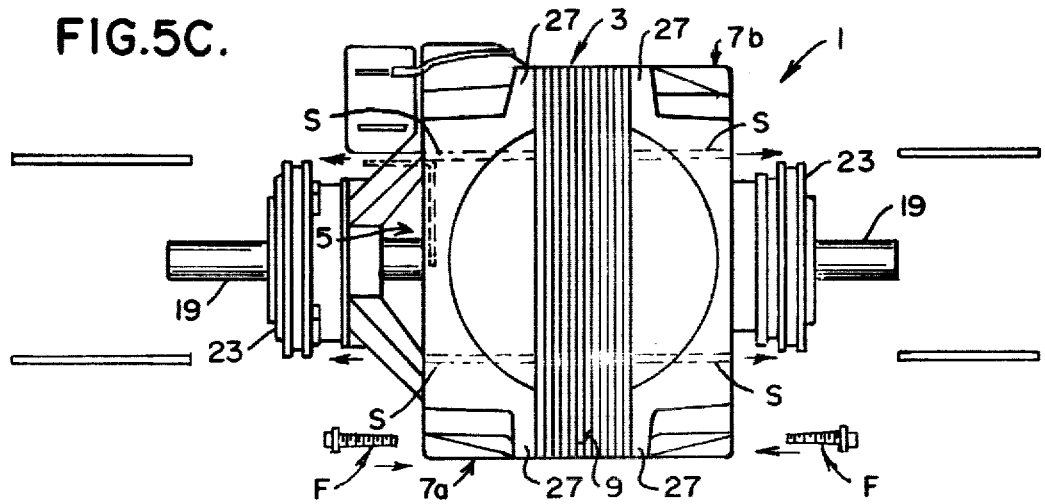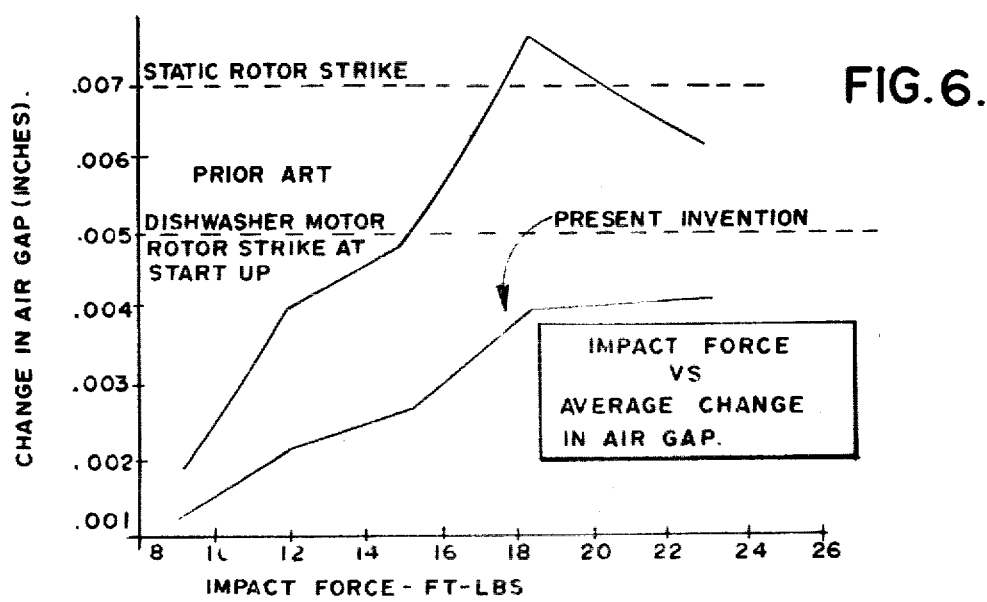

SYSTEM AND METHOD OF SECURING END SHIELDS TO THE STATOR ASSEMBLY OF A DYNAMOLELECTRIC MACHINE

BACKGROUND OF THE INVENTION

This invention relates to a system and a method of securing the end shields of a dynamoelectric machine (e.g., fractional horsepower electric motor) to the stator assembly of the motor with the rotor shaft journalled in bearings carried by the end shields and with the rotor properly positioned (i.e., centered) within the bore of the stator assembly so as to provide a uniform air gap therebetween.

Typically, a fractional horsepower motor includes a stator assembly having a stack of laminations (preferably made of sheets of suitable steel or other ferro-magnetic material) punched to have a central bore and a plurality of winding receiving slots extending generally radially outwardly from the bore. The laminations are stacked to form a core and are securely fastened together. Welding or epoxy adhesive work well as fastening methods, for example. A rotor assembly including a rotor, typically of a squirrel cage design, and an axial shaft extending from both ends thereof is provided. The rotor is intended to be received within the bore of the stator core so as to be centered therewithin and to have a substantially uniform air gap between the rotor and portions of the stator core forming the bore. These motors typically include a pair of end shields adapted to be secured to the ends of the stator assembly. The end shields each include a bearing (e.g., a suitable anti-friction bearing) in which one end of the rotor shaft is journalled so that the bearings rotatably support the motor within the stator assembly.

Heretofore, a variety of means and procedures have been used to locate (i.e., center) the rotor within the bore of the stator assembly and to secure the rotor in this centered position. Typically, during manufacture of such an electric motor, a rotor is inserted into the bore of its respective stator assembly and temporary shims are fitted so as to accurately center the motor with respect to the bore. The bearings and the end shield are then fitted on the rotor shaft and the end shields are fitted on the stator assembly. With the end shields and the rotor in proper position, the end shields are then secured to the stator and the temporary shims are removed.

Certain of the various means heretofore used to secure the end shields to the stator assembly will be now discussed. In many motors, so-called through-bolts extend through openings in the stator core and through openings in both of the end shields. Typically, the shanks of the through-bolts are somewhat smaller than the diameter of the openings in the stator core and the openings in the end shield so as to permit the end shields to be shifted relative to the stator core thereby to enable the rotor to be properly centered within the bore of the stator assembly and so as to provide the desired uniform air gap therearound. Through bolts are then tightened to a predetermined torque level while the rotor is shimmed in its desired centered location. The degree to which the through-bolts are tightened (i.e., a predetermined torque level) preloads the bolts so as to apply a clamping force between the end shields and the stator assembly. As the end shields are drawn into firm engagement with the ends of the stator assembly the friction between the end shields and the stator assembly holds the end shields in place.

Certain problems, however, have been noted with this above-noted prior art system of securing the end shields in position on the stator assembly. First, the cost of the through bolt fasteners is relatively high. Second, only the friction of the end shields on the stator assembly holds the rotor centered within the bore of the stator. If the rotor shaft or end shield shifts either during shipping or during use of the motor, it is possible for the rotor to move from its centered position thus upsetting the uniform air gap between the rotor and bore of the stator. In some instances, if the air gap becomes too small or if the rotor physically touches or "strikes" the stator, the motor fails. Since the end shields of these prior art motors are dependent entirely on the frictional force between the end shields and the stator core to hold them firmly in place, the impact force which the end shields will withstand and yet hold the rotor centered is dependent on the preload of the through-bolts. Prior motors utilizing through-bolt construction have experienced problems with the preload of the through-bolts relaxing over time. This is due in part to the fact that the stator assembly is typically dipped in an insulating varnish solution and dried. The varnish, of course, coats the outer end faces of the stator assembly and is present between the laminations of the stator assembly. When the through bolts are drawn tight, the varnish between the end shields and the stator core and the varnish between the laminations tends to seep out under compressive load, but still may be present after varnish set. In use, motor operating temperatures can soften the varnish so that it again becomes flowable and "creeps" under the compressive load. This creeping of the varnish causes the preload in the through-bolts to relax, thus lessening the frictional force available to hold the end shield in place on the stator core.

A second method or system of securing the end shields to the stator assembly involves bonding the end shields to the stator assembly once the rotor and end shields have been properly positioned relative to the stator and once the rotor is centered relative to the stator bore. Typically, a suitable epoxy adhesive or the like is used to bond the end shields in place to the stator assembly. While this method of bonding the end shields in place may offer some advantages in manufacture, improperly bonded end shields may easily be separated from the stator assembly if inadvertently struck during shipping or during use of the motor. Also, there is no ready or practical way to field repair or to economically rebuild the motor with bonded in place end shields.

Reference may be made to such U.S. Pat. Nos. as 2,423,750, 3,176,172, 3,320,660, 3,437,853, 3,707,037 and 3,966,278 which disclose various methods and systems of securing end shields in place to the stator assembly of electric motors or the like.

SUMMARY OF THE INVENTION

Among the several objects and features of this invention may be noted the provision of a system for and a method of securing the end shields of a dynamoelectric machine (e.g., a fractional horsepower electric motor) to the stator assembly of the motor in which the end shields are securely attached and in which the rotor assembly is maintained in a centered position relative to the bore of the stator assembly even when subjected to extreme impact loads;

The provision of such a system and method which is less expensive than certain other known securement systems and which speeds up production of motors thus reducing the cost of the motors;

The provisions of such a system and method which may be readily incorporated into the manufacture of a wide variety of electric motor designs;

The provision of such a system and method which results in a motor which may be readily disassembled for repair and which may be readily reassembled in the field without damage to the parts of the motor;

The provision of such a system in which the fasteners provide a mechanical interlock (as distinguished from a mere frictional securement) between the end shield and the stator assembly once the fastening system has been properly installed and tightened;

The provision of such a system which is appreciably stronger than other fastening systems against resisting impact loads applied to the end shield or the rotor shaft;

The provision of such a system and method which enables uniform air gaps to readily be established between the rotor and the bore of the stator assembly prior to final securement of the end shield in place and which reliably maintains the desired air gap throughout the service life of the motor;

The provision of such a system and method in which the force securing the end shields does not appreciably relax during the service life of the motor;

The provision of such a system and method which increases productivity of the manufacture of electric motors; and The provision of such a system and method which allows one end shield to be installed or removed from the stator assembly independently of the other.

Briefly, a dynamoelectric machine (e.g., a fractional horsepower electric motor) typically has a stator assembly including a stack of laminations of suitable magnetic material forming a core. Each of these laminations has a central opening therethrough so that the core has a central bore. The motor further includes a rotor assembly having a rotor adapted to be received within the bore of the stator assembly and a rotor shaft extending endwise from the rotor. Still further, the typical motor includes at least one end shield having a bearing for receiving and journalling the rotor shaft, the end shield being adapted to be secured in fixed relation relative to the stator assembly. Wherein, the improvement of this invention comprises a system including a plurality of holes in the core of the motor spaced around the bore and facing generally outwardly of the core at at least one end thereof. A plurality of openings in the end shield is so arranged so as to generally mate with the holes in the stator assembly when the end shield is fitted onto the stator assembly in its assembled position. A plurality of fasteners is provided, one for each of the end shield openings, the fasteners being threadably engageable with the core when inserted into the openings in the end shield and into a corresponding hole in the core and drawing the end shield into firm engagement with the stator assembly when the fasteners are tightened.

The method of this invention of assembling a dynamoelectric machine, such as a fractional horsepower motor or the like will now be generally described. Typically, the motor has a stator assembly including a core made up of a stack of laminations of suitable magnetic material, the core having a central bore extending therethrough and a plurality of holes spaced around the bore and facing generally outwardly of the core. A rotor assembly including a rotor is adapted to be rotatably received in the bore and a rotor shaft extends endwise from the rotor. At least one end shield is provided, the latter having a bearing adapted to receive and journal the rotor shaft. The method of this invention comprises the steps of inserting the rotor assembly into the stator assembly with the rotor being received in the bore. The rotor is centered with respect to the bore so that the rotor has an air gap between the rotor and the core of substantially uniform thickness therearound. An end shield is then installed on the stator assembly and on the rotor assembly so that the rotor shaft is journalled in the bearing of the end shield and so that the end shield bears against the core. The core has a plurality of holes therein which are substantially aligned with holes in the portions of the end shield which engages the core. Fasteners are inserted into the end shield holes and into the holes in the core and tightened thereby to draw the end shield into firm gripping engagement with the core so as to securely hold the end shield in place with respect to the core and to journal the rotor shaft relative to the core such that the uniform air gap is maintained.

Other objects and features of this invention will be in part apparent and in part pointed out hereinafter.

BRIEF DESCRIPTION OF THE DRAWINGS

FIG. 1 is a side elevational view of a dynamoelectric machine (e.g., a fractional horsepower electric motor) having a stator assembly, a rotor assembly and a pair of end shields secured to opposite ends of the stator assembly in accordance with the system and method of this invention for journalling the rotor assembly for rotation about its central longitudinal axis within the stator assembly, a portion of the motor being broken away to show the rotor body, the bore of the stator, and the air gap therebetween;

FIG. 2 is an enlarged cross-sectional view of a portion of the motor shown in FIG. 1 illustrating the system of this invention for securing the end shields of the motor to the stator assembly;

FIG. 3 is a view similar to FIG. 2 illustrating a prior art system of securing the end shields to the stator assembly in which a so-called through-bolt is inserted through openings in both of the end shields and through an opening in the stator assembly so as to clamp the end shields in place on the stator assembly;

FIG. 4 is a greatly enlarged view of the system of this invention illustrating a self-tapping fastener threadably inserted into an opening in the core of the stator assembly of the motor and firmly engaging the end shield of the motor;

FIGS. 5A–5C illustrate the steps of the method of this invention for securing the end shields of a motor in place on the stator assembly; and FIG. 6 is a graph comparing the impact force applied to the end shield versus the average change in the air gap of the motor for both motors assembled in accordance with the present invention and motors assembled in accordance with the systems of the prior invention, such as illustrated in FIG. 3.

Corresponding reference characters indicate corresponding parts throughout the several views of the drawings.

DESCRIPTION OF A PREFERRED EMBODIMENT

Referring now to the drawings, a dynamoelectric machine (e.g., a fractional horsepower electric motor) is indicated in its entirety at reference character 1. The motor is shown to include a stator assembly, as generally indicated at 3, a rotor assembly 5, and a pair of end shields, as generally indicated at 7a, 7b, secured to the stator assembly for journalling the rotor assembly within the stator assembly. Motor 1 may be any conventional electric motor or other dynamoelectric machine. The stator assembly is composed of a core 9 made up of a plurality of laminations 11 (see FIG. 4) arranged in a stack. Each of the laminations is preferably a pre-punched plate-like member having a central opening (not shown), a plurality of slots extending radially outwardly from the central opening, and a plurality (four are provided in the laminations as shown) of holes 13 therethrough arranged around the central opening. The laminations are made of a suitable magnetic material, preferably of sheet steel or other suitable ferro-magnetic material. With the laminations stacked so as to form core 9, the central openings are coaxial so as to form an axial circular bore 15 (see FIG. 1) extending through the stator assembly and the radial slots form openings for receiving coils of wire which constitute the windings W (see FIG. 5A) of the motor, and holes 13 are in alignment with one another so as to form holes extending through the stator core. As shown, holes 13 are generally parallel to the axis of the bore 15. It will be understood, however, that holes 13 need not extend through the core. The laminations are typically secured to one another, as by welding, so as to form a unitary core 9.

Rotor assembly 5 includes a rotor body 17, which may be a conventional squirrel cage type rotor body, having a rotor shaft 19 concentric therewith and extending outwardly from each end of the rotor body. The latter is somewhat smaller than the inside diameter of bore 15 in core 9. Thus, when rotor body 17 is centered within bore 15, a uniform air gap G (see FIG. 1) will result between the rotor body and the core.

End shields 7a, 7b are substantially identical and are preferably unitary die castings of, for example, a suitable aluminum alloy or the like. Other end shield constructions are compatible with the broader aspects of this invention. Each end shield has a central portion or pillow 21 for receiving an anti-friction bearing 23. The race of the bearing is so sized as to receive a corresponding portion of rotor shaft 19. Each end shield is further shown to comprise a plurality of legs 25 extending from the central pillow 21 thereof toward stator assembly 3. The outer ends of legs 25 have feet 27 formed thereon which engage the end face of the stator assembly. As best shown in FIG. 2, feet 27 fit on the end face of core 9 and each of the end shield feet has a corresponding opening 29 therethrough adapted to be in register with (i.e., to be generally in line with) a corresponding hole 13 in core 9 when the end shield is properly fitted on stator assembly 3 in its assembled position.

As used in this disclosure, the term "end shield" refers, in a generic sense, to denote any type of structure which is fitted onto the end of the stator assembly of a motor so as to rotatably journal the rotor assembly in the stator. This term would apply to any structure whether or not it has a shielding function.

In accordance with the system of this invention, with rotor assembly 5 fitted within bore 15 of core 9, shims S (see FIGS. 5A–5C) are fitted between the rotor and the bore so as to form a uniform air gap G therearound. provided. These shims are adapted to be inserted into the gap between rotor body 17 and core 9 so as to hold the rotor centered within bore 15. End shields 7a, 7b are then installed on shaft 19 so that the rotor shaft is received within the inner races of bearings 23 and the end shields are fitted on rotor assembly 3 so that their feet 27 engage core 9 (preferably the end face thereof) with holes 29 substantially in register with holes 13 in core 9. Fasteners F, preferably self-tapping fasteners, are then inserted into each of the openings 29 and into each of the corresponding holes 13 and tightened. As shown in FIG. 4, each fastener F is shown to have a tapered shank 31 with self-tapping threads 33 thereon for progressive threadable engagement with laminations 11 of core 9 adjacent hole 13 as the fastener is threaded into the hole. Each of the fasteners has a head 35 with an outwardly projecting flange 37, the latter being considerably larger than opening 29 in end shield foot 27 so as to engage the end shield when the fastener is tightened. Head 35 has a slot 39 therein for reception of a suitable fastener driving tool (e.g., a screw driver or the like) for tightening of the fastener. Other head 35 designs may be employed, if desired. Still further, fastener flange 37 has an annular projection delimiting a tooth 41 on its bottom face which dig into the end shield foot 27 adjacent openin 29 as the fastener is drawn tight so as to at least partially mechanically interlock the fastener to the end shield and to greatly inhibit sliding movement of the end shield relative to the fastener.

As shown in FIG. 4, opening 29 is somewhat larger than shank 31 of fastener F so as to permit the end shields to be shifted on core 9 with fasteners F in place (but not tightened) and to accommodate a range of alignments between the rotor and stator assemblies. As each fastener F is drawn tight, leg 27 of end shield 7a or 7b is drawn into firm gripping engagement with the outer end face of core 9. As mentioned above, tooth 41 digs into the end shield and provide at least some mechanical interlocking between the end shield and the core. Further interlocking is provided due to the tightening of the fastener causing, in some instances, a slight deformation (e.g., an outward protrusion), as indicated at 42 in FIG. 4, of the outside laminations 11 of core 9 adjacent hole 13. As shown in FIG. 4, these protrusions 42 of the outer laminations are greatly exaggerated for purposes of illustration, but it will be seen that the outer laminations are nevertheless drawn outwardly and are drawn into opening 27 of end shield leg 29. These protrusions therefore hold the end shield in its desired position relative to the stator assembly and effectively present sideways movement of the end shield relative to core 9 in the event it is impacted in sidewise direction or in the event a load, such as a pulley load, is applied to the motor. It will be noted that if the end shield is forced sideways in any direction relative to the stator core, these protrusions of the outside laminations of the core force the end shield to move outwardly away from the end face of the core and this in turn places additional tension loading on fasteners F. This additional tension loading on the fasteners, of course allows the fasteners to more securely hold the end shield in fixed position fixed on the core even when the fasteners are torqued to relatively low preload levels.

A typical prior art through-bolt end shield attachment system is illustrated in FIG. 3. Core 9' of motor 1' has a plurality of holes 13' therethrough. End shields 7a', 7b' of motor 1' have feet 27' which bear against the end faces of core 9'. A so-called through bolt B is inserted through holes 29' in the end shield feet and through holes 13' in core 9'. It will be noted that holes 13' and holes 29' are, of necessity, somewhat larger than the outside diameter of the shank of through bolt B. With the end shield 7a', 7b' properly positioned on core 9' with the rotor centered within the bore of the stator assembly, through-bolts B of the prior art end shield securement system are tightened to a predetermined torque level so as to preload the bolts to a desired level and so as to draw the end shield feet into firm engagement with the end faces of core 9. However, because the through-bolts are somewhat smaller than the holes through core 9' and through end shield feet 27', the end shields are dependent entirely on the tension (i.e., the preload) of through-bolts B to generate sufficient frictional force between the end shield and the core so as to firmly hold the end shields in place.

As heretofore mentioned, it is conventional in the manufacture of electric motors to insulate the stator assembly by dipping it into a bath of insulating varnish and by baking the varnish so as to provide an insulation coating on the stator assembly. This varnish, of course, coats the end faces of the core and is disposed between the laminations of the core. Two problems have been noted upon tightening the above-discussed prior art through-bolt fastening system. First, the varnish under the heads and nuts of the through-bolts and the varnish between the laminations of the core tends to creep under compression loading thus causing the preload in the through bolts to relax. Upon relaxation of the preload in the through bolts, the frictional force in holding the end shields in place on the core is appreciably lower thereby allowing the end shields to be more readily displaced or moved relative to the core. This makes movement of the end shields relative to the core more likely upon the end shield or the rotor shaft being impacted either during shipping or during the service life of the motor. Movement of the end shield, of course, causes shifting of the rotor within the bore which may cause possible "rotor strike" malfunctions of the motor.

In sharp contrast, the fastening system of the present invention overcomes the above-noted problem of prior art fastening systems. In particular, it will be noted that the threaded shank S1 of each fastener F of the present invention is firmly embedded in a respective hole 13 of core 11. Thus, fastener F has no play or movement relative to core 9 and the portion of fastener shank 31 which extends out beyond the end face of the core constitutes a stiff cantilever member for holding the end shield firmly in place. With fastener F tightened, and with teeth 41 of the fastener dug into the metal of the end shield feet 27 adjacent holes 29, the end shield and the core are mechanically interlocked not only by teeth 41, but by the outwardly protruding portions 42 of the laminations. Still further, the stiff cantilevered shank of the fastener further aids in holding the end shield in position.

Further in accordance with the system of this invention, rotor 17 is centered within bore 15 prior to securement in place of the end shields by fasteners F by means of shims S (see FIGS. 5A–5C) which are adapted to be inserted into gap G between the rotor and the bore. As shown, shims S are elongate rod-like shims having a thickness conforming to the nominal thickness of the desired air gap G. The shims may be inserted into the air gap at spaced intervals around the rotor by inserting them through openings (e.g., the openings formed by legs 25) in end shields 7a, 7b. For example, the shims may be inserted or removed after the end shields have been fitted in place or the shims may be inserted prior to fitting of the end shields in place.

The method of this invention for assembling an electric motor includes the steps of first inserting a rotor assembly 5 into the bore 15 of a stator assembly 3 (as shown in FIG. 5A). Then, end shields 7a, 7b are fitted on the stator assembly so that the ends of the rotor shaft 19 are received within the inner races of bearings 23 and so that feet 27 of the end shields fit on their respective end faces of core 9 with openings 29 in the end shield in register with holes 13 in the core. Shims S are then inserted through openings in the end shields into air gap G between rotor 17 and bore 15 thereby to center the rotor within the bore and to establish a desired air gap G of substantially uniform thickness around the rotor. It will be understood that the shims could be positioned between the rotor and the bore prior to fitting the end shields in place. Next, fasteners F are inserted into their respective openings 29 in end shields 7a, 7b and into mating holes 13 in core 9 and are driven (i.e., tightened) so that the fasteners self-tap into the core laminations 11 and so as to firmly draw the end shields into gripping engagement with core 9 while the rotor is held in its desired position with respect to bore 15 by shims S. After securement of the end shields in place, shims S are removed (i.e., pulled) from the rotor and the stator assembly.

EXAMPLE

A test was conducted to compare the impact strength of motors assembled in accordance with this invention and of motors assembled in accordance with the prior end shield fastening systems with the rotor centering of the motors. 106 dishwasher motors were assembled utilizing the system in the method of this invention as heretofore described. Fasteners F of different motors were tightened to predetermined torque levels corresponding to various preloads of fastener F as follows:

| GROUP | ACTUAL TORQUE RANGE | QUANTITY |
| --- | --- | --- |
| Low torque | 50–60 in./lb. | 40 |
| Medium torque | 60–75 in./lb. | 20 |
| Medium torque of reassembled motor | 60–75 in./lb. | 20 |
| High torque | 95–115 in./lb. | 26 |

The above motors were tested against forty conventional dishwasher motors having their end shields secured in place on their stator assemblies by through-bolts substantially as shown in FIG. 3. These through-bolts were tightened to have a preload torque ranging between 145–135 in./lb. The motors constructed in accordance with the system and method of this invention and the motors constructed in accordance with the prior are were subjected to impact loads applied to their end shields or rotor shaft and the shift in the air gap between the rotor and the core of the motors was recorded. In FIG. 6, the average shift in air gap versus the impact force applied to both the prior art motors and the motors made in accordance with the present invention are shown. Suprisingly, the average shift in air gap of motors constructed in accordance with the present invention is appreciably lower than the prior art through bolt securement system at all impact levels tested even though fasteners F were tightened to lower preload levels (e.g., torque levels). Additionally, it will be noted that the prior art fastening system resulted in a shift of the air gap of such magnitude as to cause rotor strike upon start up of the motor when the motor had been subjected to impact loads in excess of 15 ft./lb. When the prior art motors were subjected to impact loads in excess of 18 ft./lb., static motor strike could occur. It is significant that the average shift in air gap at all impact levels tested of motors made in accordance with the system and method of the present invention was well below the air gap shifts required to cause either static or start up rotor strike. Also, the system and method of this invention for securement of end shields in place has a significantly higher resistance to impact loads which may be incurred during shipping or during the service life of the motor. Thus, the motors assembled in accordance with the method and system of this invention are not as sensitive to initial tightening torque or to preload of the fasteners as are motors utilizing the prior art through-bolt fastening system.

Still further, it is pointed out that fasteners F of the present system and method threadably engage the outermost laminations 11 of core 9 and thus substantially eliminate any effect that creep between laminations 11 of the core may have. Thus, the preload in fasteners F of the present invention are not as likely to relax as are prior through-bolt fastener systems due to creep of the varnish material from between the core laminations.

While the system and method the present invention has been herein described as preferably using self-tapping fasteners F to secure the end shields to the core, it will be understood that conventional threaded fasteners inserted into threaded holes in the core may be used.

It will be noted that end shields 7a, 7b may be installed or removed from stator assembly 3 independently of one another.

In view of the above, it will be seen that the several objects of the invention are achieved and that other advantageous results are attained.

As various changes could be made in the above constructions and methods without departing from the scope of this invention, it is intended that all matter contained in the above description or shown in the accompanying drawings shall be interpreted as illustrative and not in a limiting sense.

I claim:
1. An electric motor comprising a stator assembly including a core assembled from a stack of laminations, said core having a central bore extending longitudinally therethrough and a plurality of holes in said core surrounding said bore and facing generally endwise of said core, a rotor assembly including a rotor body adapted to be centered within said bore and a rotor shaft extending endwise from said rotor body, and at least one bearing support having a bearing for reception and journalling of said rotor shaft thereby to rotatably support said rotor within said bore, said bearing support having a plurality of openings therein substantially in register with said holes in said core when said bearing support is fitted on said stator assembly, and a plurality of fasteners, one for each of said bearing support openings and said holes, said fasteners upon being tightened firmly drawing said bearing support into firm engagement with said core and bending outwardly at least the outermost lamination adjacent a respective said hole in said core so that said outwardly bent portion of said lamination protrudes at least partially into a mating opening in said bearing support so as to prevent shifting of said bearing support with respect to said stator assembly and to positively hold said rotor assembly within its desired position relative to said stator assembly.

2. In a dynamoelectric machine having a stator assembly including a stack of laminations of suitable sheet-like magnetic material forming a core, each of said laminations having a central opening therethrough so that said core has a central bore therethrough and further having a plurality of holes therein so that said core has a plurality of holes therein with the axis of said holes being generally parallel to the longitudinal axis of said central bore, a rotor including a rotor adapted to be received within said bore and a rotor shaft extending endwise from said rotor, and at least one bearing support having a bearing for receiving and journalling said rotor shaft, said bearing support having a plurality of openings therein so arranged to generally mate with said holes in said stator assembly when said bearing support is fitted on said stator assembly in its assembled position, wherein said improvement comprises:

a plurality of self-tapping fasteners, one for each of said bearing support openings and of said holes, said self-tapping fasteners threadably engaging said core so as to draw said bearing support into firm engagement with said stator assembly said self-tapping fasteners effecting the outward bending of at least the outermost lamination of said core to extend at least partially into said opening of said bearing support thereby to inhibit sidewise movement of said bearing support relative to said core.

* * * * *